(12) United States Patent
Tachibanada et al.

(10) Patent No.: US 9,109,697 B2
(45) Date of Patent: Aug. 18, 2015

(54) AUTOMATIC TRANSMISSION

(71) Applicant: HONDA MOTOR CO., LTD., Tokyo (JP)

(72) Inventors: Yuya Tachibanada, Wako (JP); Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 14/284,348

(22) Filed: May 21, 2014

(65) Prior Publication Data

US 2014/0350808 A1 Nov. 27, 2014

(30) Foreign Application Priority Data

May 23, 2013 (JP) .................................. 2013-109409

(51) Int. Cl.
*F16H 61/68* (2006.01)

(52) U.S. Cl.
CPC ...................................... *F16H 61/68* (2013.01)

(58) Field of Classification Search
CPC ............. F16H 61/68; F16H 3/62; F16H 3/68; F16H 3/78; F16H 1/00; F16H 1/28; F16H 1/2818; F16H 1/2827; F16H 1/2836; F16H 2001/2872; F16H 3/006; F16H 206/085; F16H 206/0455; F16H 2061/0481; F16H 2061/0485; F16H 2061/0488; F16H 2710/04

See application file for complete search history.

(56) References Cited

U.S. PATENT DOCUMENTS

2001/0037697 A1* 11/2001 Nanri et al. ..................... 74/335

FOREIGN PATENT DOCUMENTS

JP 2012-97864 5/2012

* cited by examiner

*Primary Examiner* — Ramya Burgess
*Assistant Examiner* — David J Hlavka
(74) *Attorney, Agent, or Firm* — Mori & Ward, LLP

(57) ABSTRACT

An automatic transmission includes an input member, a planetary gear mechanism, a plurality of engagement mechanisms, an output member, a shift position detector, an input rotational speed detector, a controller, and a switching mechanism. The controller is configured to set the switching mechanism in a reverse-rotation prevention state when a shift position is set in a forward movement range and configured to set the switching mechanism in a fixed state when the shift position is set in a backward movement range. The controller is configured to control the plurality of engagement mechanisms so that the input member is capable of rotating and rotation of the output member is prevented in a case in which a vehicle is moving backward, the shift position is switched from the backward movement range to the forward movement range, and a vehicle speed is greater than or equal to a first predetermined speed.

10 Claims, 8 Drawing Sheets

FIG. 4

| | B1 | B2 | B3 | B4 | C1 | C2 | C3 | TRANSMISSION GEAR RATIO | COMMON RATIO |
|---|---|---|---|---|---|---|---|---|---|
| Rvs | L | | ○ | | | ○ | | 4.008 | |
| 1st | R/L | ○ | ○ | | | | | 5.233 | 1.554 |
| 2nd | R | ○ | ○ | | | | ○ | 3.367 | 1.465 |
| 3rd | R | ○ | ○ | | | ○ | | 2.298 | 1.348 |
| 4th | R | ○ | | | | ○ | ○ | 1.705 | 1.251 |
| 5th | R | ○ | | | ○ | ○ | | 1.363 | 1.363 |
| 6th | R | | | | ○ | ○ | | 1.000 | 1.273 |
| 7th | R | | ○ | | ○ | | ○ | 0.786 | 1.196 |
| 8th | R | | ○ | | ○ | | | 0.657 | 1.126 |
| 9th | R | | ○ | ○ | ○ | | | 0.584 | 1.120 |
| 10th | R | | | ○ | ○ | | ○ | 0.520 | |

AUTOMATIC TRANSMISSION

CROSS-REFERENCE TO RELATED APPLICATIONS

The present application claims priority under 35 U.S.C. §119 to Japanese Patent Application No. 2013-109409, filed May 23, 2013, entitled "Automatic Transmission." The contents of this application are incorporated herein by reference in their entirety.

BACKGROUND

1. Field

The present disclosure relates to an automatic transmission.

2. Description of the Related Art

Hitherto, an automatic transmission capable of providing 8-forward-gear-speed and 1-reverse-gear-speed transmission using four planetary gear mechanisms and six engagement mechanisms including clutches and brakes is known (refer to, for example, Japanese Unexamined Patent Application Publication No. 2012-97864 (Patent Document 1)).

The automatic transmission in the Patent Document 1 includes an input shaft rotatably supported in a housing, and an output member including an output gear disposed concentrically with the input shaft in the housing. Rotation of the output member is transmitted to left and right driving wheels of a vehicle via a differential gear or a propeller shaft.

Four planetary mechanisms, that is, a first planetary gear mechanism to a fourth planetary gear mechanism are concentrically disposed with the input shaft in the housing. The first planetary gear mechanism is what is called a single-pinion planetary gear mechanism including three elements, that is, a first sun gear, a first ring gear, and a first carrier that supports a first pinion so that the first pinion is rotatable about its axis and revolvable. The first pinion engages with the first sun gear and the first ring gear. (The single-pinion planetary gear mechanism is also called a minus planetary gear mechanism or a negative planetary gear mechanism because when the carrier is fixed and the sun gear is rotated, the ring gear and the sun gear rotate in different directions.) When the ring gear is fixed and the sun gear is rotated, the carrier rotates in the same direction as the sun gear.)

When the three elements of the first planetary gear mechanism are defined as a first element, a second element, and a third element that are arranged from one side in the sequence shown in the collinear diagram of the first planetary gear mechanism (a diagram that can show the ratios of the relative rotational speeds among the three elements, the sun gear, the carrier, and the ring gear in straight lines (speed lines)), the first element is the first sun gear, the second element is the first carrier, and the third element is the first ring gear.

The second planetary gear mechanism is also what is called a single-pinion planetary gear mechanism including three elements, that is, a second sun gear, a second ring gear, and a second carrier that supports a second pinion so that the second pinion is rotatable about its axis and revolvable. The second pinion engages with the second sun gear and the second ring gear. When the three elements of the second planetary gear mechanism are defined as a fourth element, a fifth element, and a sixth element that are arranged from one side in the sequence shown in the collinear diagram of the second planetary gear mechanism, the fourth element is the second ring gear, the fifth element is the second carrier, and the sixth element is the second sun gear.

The third planetary gear mechanism is also what is called a single-pinion planetary gear mechanism including three elements, that is, a third sun gear, a third ring gear, and a third carrier that supports a third pinion so that the third pinion is rotatable about its axis and revolvable. The third pinion engages with the third sun gear and the third ring gear. When the three elements of the third planetary gear mechanism are defined as a seventh element, an eighth element, and a ninth element that are arranged from one side in the sequence shown in the collinear diagram of the third planetary gear mechanism, the seventh element is the third sun gear, the eighth element is the third carrier, and the ninth element is the third ring gear.

The fourth planetary gear mechanism is also what is called a single-pinion planetary gear mechanism including three elements, that is, a fourth sun gear, a fourth ring gear, and a fourth carrier that supports a fourth pinion so that the fourth pinion is rotatable about its axis and revolvable. The fourth pinion engages with the fourth sun gear and the fourth ring gear. When the three elements of the fourth planetary gear mechanism are defined as a tenth element, an eleventh element, and a twelfth element that are arranged from one side in the sequence shown in the collinear diagram of the fourth planetary gear mechanism, the tenth element is the fourth ring gear, the eleventh element is the fourth carrier, and the twelfth element is the fourth sun gear.

The first sun gear (first element) of the first planetary gear mechanism is connected to the input shaft. The fourth ring gear (tenth element) of the fourth planetary gear mechanism is connected to the output member.

The first carrier (second element) of the first planetary gear mechanism is connected to the second carrier (fifth element) of the second planetary mechanism and the third ring gear (ninth element) of the third planetary gear mechanism, and form a first connected member (second element, fifth element, and ninth element). The first ring gear (third element) of the first planetary gear mechanism and the fourth sun gear (twelfth element) of the fourth planetary gear mechanism are connected to each other, and form a second connected member (third element and twelfth element). The third carrier (eighth element) of the third planetary gear mechanism and the fourth carrier (eleventh element) of the fourth planetary gear mechanism are connected to each other, and form a third connected member (eighth element and eleventh element).

The automatic transmission in Patent Document 1 includes a total of six engagement mechanisms including three clutches, that is, first to third clutches, and three brakes, that is, first to third brakes.

The first clutch is a wet multi-plate clutch and is configured so as to be switchable between a connection state in which the sun gear (first element) of the first planetary gear mechanism and the third connected member (eighth element and eleventh element) are connected to each other and a release state in which the sun gear and the third connected member are disconnected from each other. The second clutch is a wet multi-plate clutch and is configured so as to be switchable between a connection state in which the first sun gear (first element) of the first planetary gear mechanism and the second ring gear (fourth element) of the second planetary gear mechanism are connected to each other and a release state in which the first sun gear and the second ring gear are disconnected from each other.

The third clutch is a wet multi-plate clutch and is configured so as to be switchable between a connection state in which the second sun gear (sixth element) of the second planetary gear mechanism and the second connected member (third element and twelfth element) are connected to each other and a release state in which the second sun gear and the second connected member are disconnected from each other. The first brake is a wet multi-plate brake and is configured so as to be switchable between a fixed state in which the third connected member (eighth element and eleventh element) is fixed to the housing and a release state in which the third connected member is unfixed from the housing.

The second brake is a wet multi-plate brake and is configured so as to be switchable between a fixed state in which the third sun gear (seventh element) of the third planetary gear mechanism is fixed to the housing and a release state in which the third sun gear is unfixed from the housing. The third brake is a wet multi-plate brake and is configured so as to be switchable between a fixed state in which the second sun gear (sixth element) of the second planetary gear mechanism is fixed to the housing and a release state in which the second sun gear is unfixed from the housing.

In the automatic transmission in Patent Document 1, a forward first gear is established by setting the first brake, the second brake, and the third brake in a fixed state. A forward second gear is established by setting the second brake and the third brake in the fixed state and the third clutch in a connection state. A forward third gear is established by setting the second brake and the third brake in the fixed state and the second clutch in a connection state. A forward fourth gear is established by setting the second brake in the fixed state and the second clutch and the third clutch in the connection state.

A forward fifth gear is established by setting the second brake in the fixed state and the first clutch and the second clutch to the connection state. A forward sixth gear is established by setting the three clutches, that is, the first to third clutches, in the connection state. A forward seventh gear is established by setting the third brake in the fixed state and the first clutch and the second clutch to the connection state. A forward eighth gear is established by setting the third brake to the fixed state and the first clutch and the third clutch in the connection state. A reverse gear is established by setting the first brake and the third brake in the fixed state and the second clutch in the connection state.

SUMMARY

According to one aspect of the present invention, an automatic transmission includes an input member, a planetary gear mechanism, a plurality of engagement mechanisms, an output member, a shift position detecting unit, an input rotational speed detecting unit, a controller, and a switching mechanism. The input member is disposed in a housing and receives power of a driving source via a torque converter. The planetary gear mechanism includes a plurality of elements that are rotatable in the housing. The plurality of engagement mechanisms are switchable to a connection state in which the elements are connected to each other or to a fixed state in which the elements are fixed to the housing. The shift position detecting unit detects a shift position. The input rotational speed detecting unit detects a rotational speed of the input member. The controller receives information regarding the detected rotational speed from the input rotational speed detecting unit and information regarding the shift position from the shift position detecting unit. The controller controls the engagement mechanisms. The rotational speed of the input member is changed into a plurality of gear speeds and rotation of the input member is freely output from the output member. The switching mechanism is switchable between a reverse-rotation prevention state and a fixed state. The reverse-rotation prevention state is a state in which forward rotation of one of the plurality of elements is allowed and reverse rotation of the one of the plurality of elements is prevented. The forward rotation is in a rotation direction when a vehicle moves forward. The reverse rotation is in a rotation direction when the vehicle moves backward. The fixed state is a state in which the one of the plurality of elements is fixed to the housing. The controller sets the switching mechanism in the reverse-rotation prevention state when the shift position is set in a forward movement range and sets the switching mechanism in the fixed state when the shift position is set in a backward movement range. When the vehicle is moving backward and the shift position is switched from the backward movement range to the forward movement range, if a vehicle speed is greater than or equal to a first predetermined speed, the controller controls the engagement mechanisms so that the input member is capable of rotating freely and rotation of the output member is prevented.

According to another aspect of the present invention, an automatic transmission includes an input member, a planetary gear mechanism, a plurality of engagement mechanisms, an output member, a shift position detector, an input rotational speed detector, a controller, and a switching mechanism. The input member is disposed in a housing and receives power of a driving source via a torque converter. The planetary gear mechanism includes a plurality of elements that are rotatable in the housing. The plurality of engagement mechanisms are switchable to a connection state in which the elements are connected to each other or to a fixed state in which the elements are fixed to the housing. A rotation of the input member is to be transmitted to the output member to change a rotational speed. The shift position detector is configured to detect a shift position. The input rotational speed detector is configured to detect a rotational speed of the input member. The controller is configured to receive information regarding the detected rotational speed from the input rotational speed detector and information regarding the shift position from the shift position detector. The switching mechanism is switchable between a reverse-rotation prevention state and a fixed state. The reverse-rotation prevention state is a state in which forward rotation of one of the plurality of elements is allowed and reverse rotation of the one of the plurality of elements is prevented. The forward rotation is in a rotation direction when a vehicle moves forward. The reverse rotation is in a rotation direction when the vehicle moves backward. The fixed state is a state in which the one of the plurality of elements is fixed to the housing. The controller is configured to set the switching mechanism in the reverse-rotation prevention state when the shift position is set in a forward movement range and configured to set the switching mechanism in the fixed state when the shift position is set in a backward movement range. The controller is configured to control the plurality of engagement mechanisms so that the input member is capable of rotating and rotation of the output member is prevented in a case in which the vehicle is moving backward, the shift position is switched from the backward movement range to the forward movement range, and a vehicle speed is greater than or equal to a first predetermined speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is an explanatory view of states of engagement mechanisms in transmission gears of the automatic transmission according to the embodiment.

DESCRIPTION OF THE EMBODIMENTS

Figure 1:
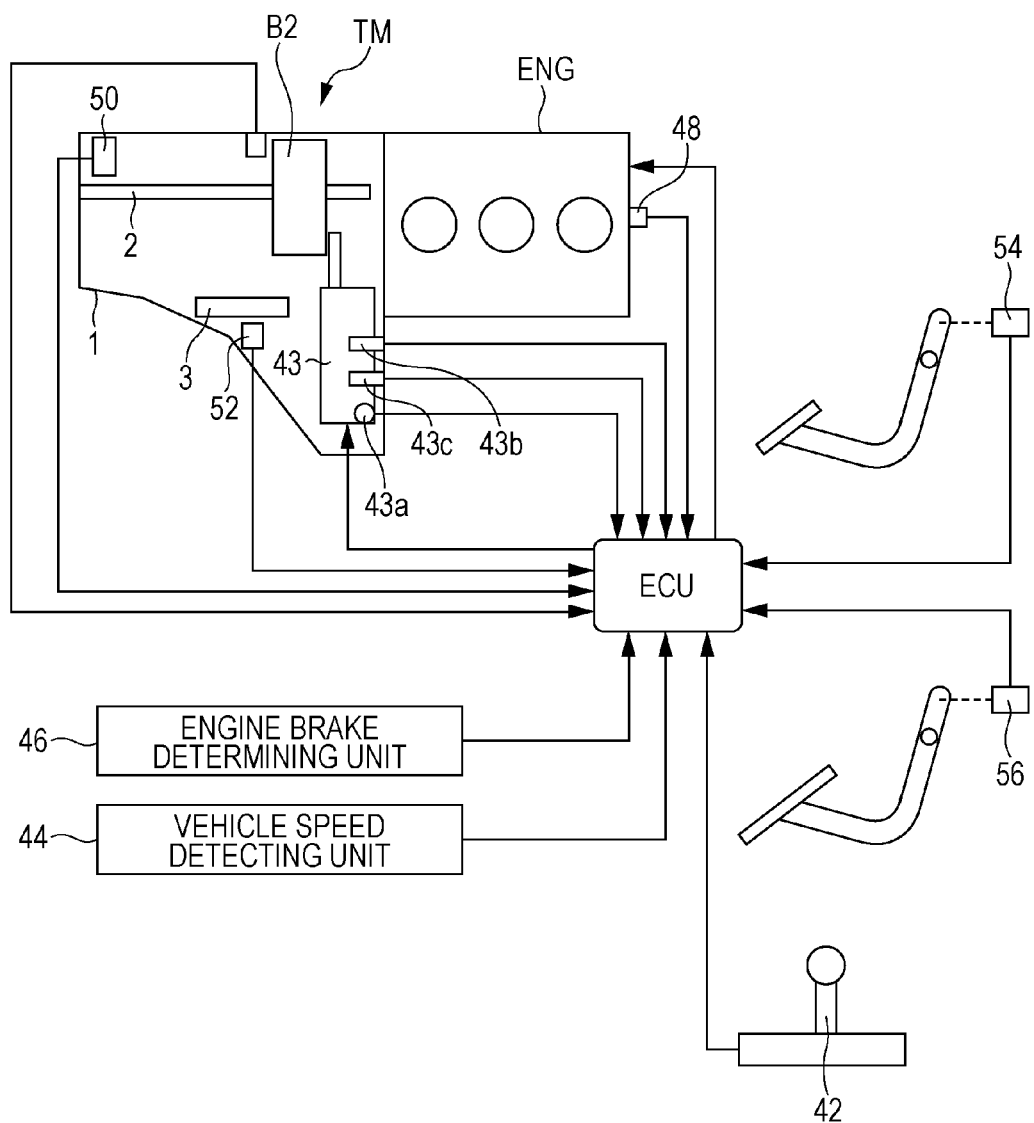
FIG. 1 is a schematic explanatory view of an automatic transmission according to an embodiment of the present disclosure.

The embodiments will now be described with reference to the accompanying drawings, wherein like reference numerals designate corresponding or identical elements throughout the various drawings.

Figure 2:
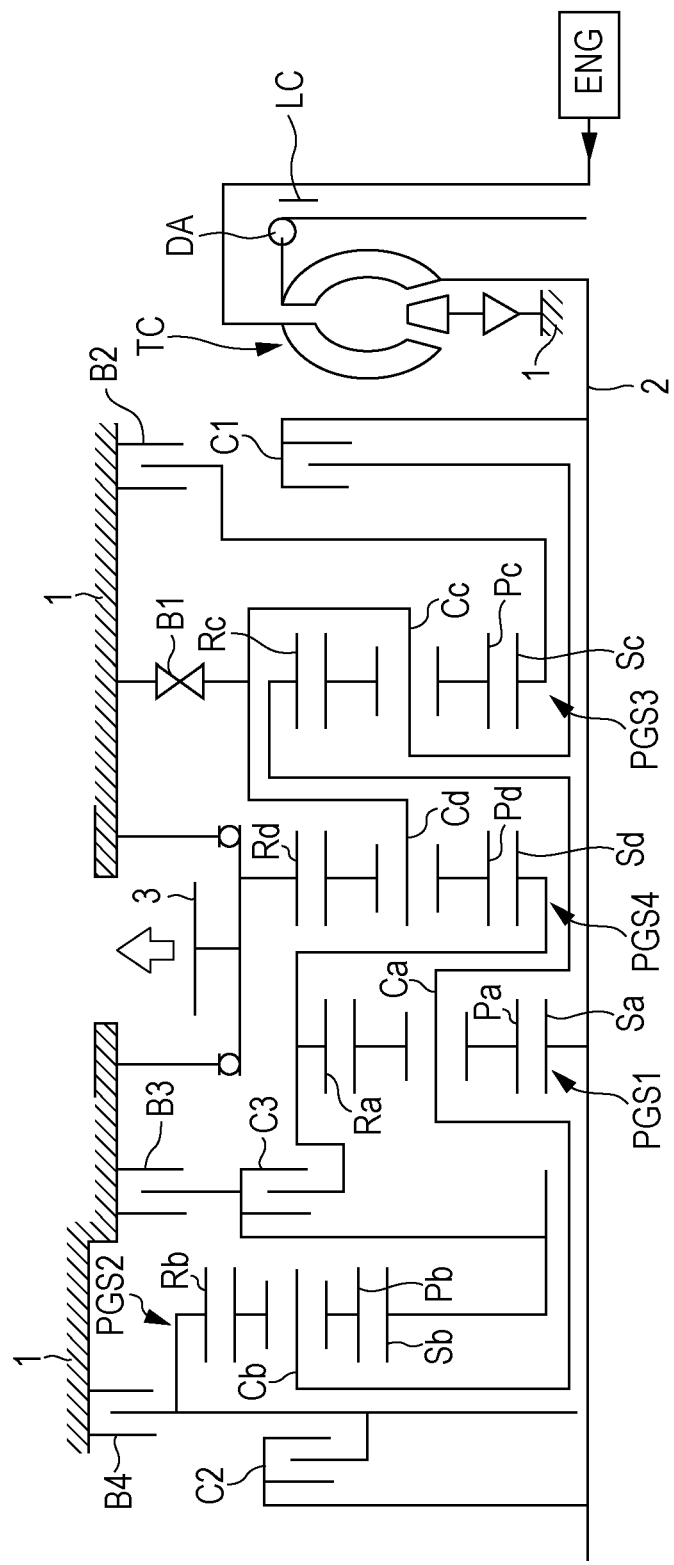
FIG. 2 is a skeleton view of the automatic transmission according to the embodiment.

FIGS. 1 and 2 each show an automatic transmission TM according to an embodiment of the present disclosure. The automatic transmission TM includes an input shaft 2, serving as an input member, and an output member 3. The input shaft 2 is rotatably supported in a housing 1 and receives driving force via a torque converter TC including a lock-up clutch LC and a damper DA. The driving force is output from a driving source ENG, such as an internal combustion engine (an engine). The output member 3 includes an output gear disposed concentrically with the input shaft 2.

Rotation of the output member 3 is transmitted to left and right driving wheels of a vehicle via a differential gear or a propeller shaft (neither of which is shown). Instead of the torque converter TC, a single-plate or a multi-plate starting clutch, configured to be frictionally engageable, may be provided.

Four planetary gear mechanisms, that is, a first planetary gear mechanism PGS1 to a fourth planetary gear mechanism PGS4 are disposed concentrically with the input shaft 2 in the housing 1. The first planetary gear mechanism PGS1 is what is called a single-pinion planetary gear mechanism including a sun gear Sa, a ring gear Ra, and a carrier Ca that supports a pinion Pa so that the pinion Pa is rotatable about its axis and is revolvable. The pinion Pa engages with the sun gear Sa and the ring gear Ra. (The single-pinion planetary gear mechanism is also called a minus planetary gear mechanism or a negative planetary gear mechanism because when the carrier is fixed and the sun gear is rotated, the ring gear rotates in a direction that differs from that of the sun gear. When the ring gear is fixed and the sun gear is rotated, the carrier rotates in the same direction as the sun gear.)

Figure 3:
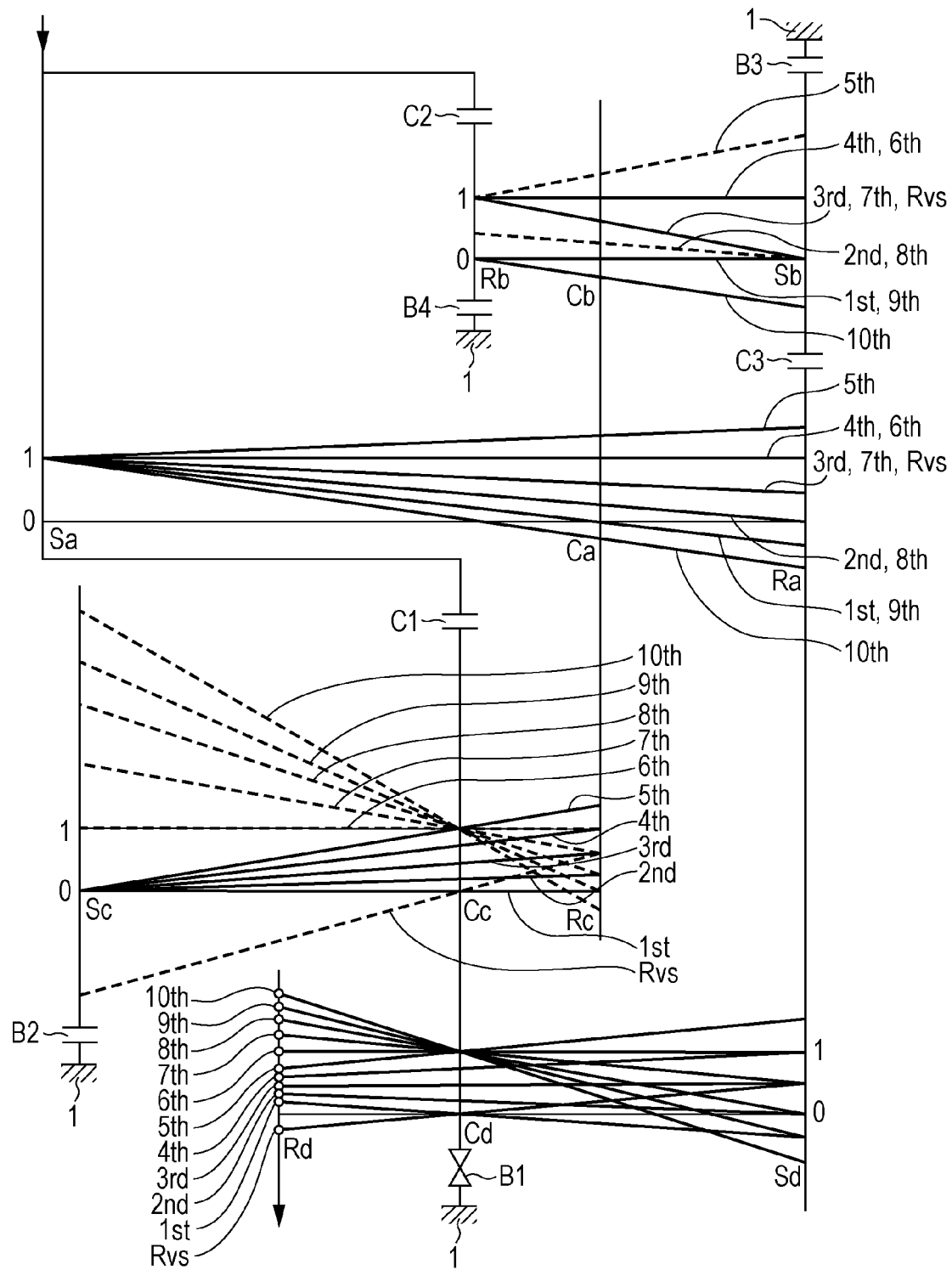
FIG. 3 is a collinear diagram of planetary gear mechanisms according to the embodiment.

FIG. 3 is a collinear diagram of the four planetary gear mechanisms, that is, the first planetary gear mechanism PGS1 to the fourth planetary gear mechanism PGS4. In the specification, the collinear diagram is defined as a diagram that indicates ratios among relative rotational speeds of the three elements (the sun gear, the carrier, and the ring gear) using straight lines (speed lines). In the collinear diagram, the three elements are disposed at intervals corresponding to the gear ratios (the number of teeth of the ring gear/the number of teeth of the sun gear).

Referring to the collinear diagram of the first planetary gear mechanism PGS1 that is shown in a second section from the top in FIG. 3, when the three elements Sa, Ca, and Ra of the first planetary gear mechanism PGS1 are defined as a first element, a second element, and a third element, respectively, in this sequence from the left in the collinear diagram, the first element is the sun gear Sa, the second element is the carrier Ca, and the third element is the ring gear Ra.

Here, the ratio of the interval between the sun gear Sa and the carrier Ca to the interval between the carrier Ca and the ring gear Ra is h:1, where h denotes the gear ratio of the first planetary gear mechanism PGS1. In the collinear diagram, a lower horizontal line and an upper horizontal line (lines that are superimposed upon lines indicated by 4th and 6th) indicate, respectively, that the rotational speed is "0" and that the rotational speed is "1" (the rotational speed being the same as the rotational speed of the input shaft 2).

The second planetary gear mechanism PGS2 is also what is called a single-pinion planetary gear mechanism including a sun gear Sb, a ring gear Rb, and a carrier Cb that supports a pinion Pb so that the pinion Pb is rotatable about its axis and is revolvable. The pinion Pb engages with the sun gear Sb and the ring gear Rb.

Referring to the collinear diagram of the second planetary gear mechanism PGS2 that is shown in a first section from the top (topmost section) in FIG. 3, when the three elements Sb, Cb, and Rb of the second planetary gear mechanism PGS2 are defined as a fourth element, a fifth element, and a sixth element, respectively, in this sequence from the left in the collinear diagram, the fourth element is the ring gear Rb, the fifth element is the carrier Cb, and the sixth element is the sun gear Sb. The ratio of the interval between the sun gear Sb and the carrier Cb to the interval between the carrier Cb and the ring gear Rb is i:1, where i denotes the gear ratio of the second planetary gear mechanism PGS2.

The third planetary gear mechanism PGS3 is also what is called a single-pinion planetary gear mechanism including a sun gear Sc, a ring gear Rc, and a carrier Cc that supports a pinion Pc so that the pinion Pc is rotatable about its axis and is revolvable. The pinion Pc engages with the sun gear Sc and the ring gear Rc.

Referring to the collinear diagram of the third planetary gear mechanism PGS3 that is shown in a third section from the top in FIG. 3, when the three elements Sc, Cc, and Rc of the third planetary gear mechanism PGS3 are defined as a seventh element, an eighth element, and a ninth element, respectively, in this sequence from the left in the collinear diagram, the seventh element is the sun gear Sc, the eighth element is the carrier Cc, and the ninth element is the ring gear Rc. The ratio of the interval between the sun gear Sc and the carrier Cc to the interval between the carrier Cc and the ring gear Rc is j:1, where j denotes the gear ratio of the third planetary gear mechanism PGS3.

The fourth planetary gear mechanism PGS4 is also what is called a single-pinion planetary gear mechanism including a sun gear Sd, a ring gear Rd, and a carrier Cd that supports a pinion Pd so that the pinion Pd is rotatable about its axis and is revolvable. The pinion Pd engages with the sun gear Sd and the ring gear Rd.

Referring to the collinear diagram of the fourth planetary gear mechanism PGS4 that is shown in a fourth section (lowest section) from the top in FIG. 3, when the three elements Sd, Cd, and Rd of the fourth planetary gear mechanism PGS4 are defined as a tenth element, an eleventh element, and a twelfth element, respectively, in this sequence from the left in the collinear diagram, the tenth element is the ring gear Rd, the eleventh element is the carrier Cd, and the twelfth element is the sun gear Sd. The ratio of the interval between the sun gear Sd and the carrier Cd to the interval between the carrier Cd and the ring gear Rd is k:1, where k denotes the gear ratio of the fourth planetary gear mechanism PGS4.

The sun gear Sa (first element) of the first planetary gear mechanism PGS1 is connected to the input shaft 2. The ring gear Rd (tenth element) of the fourth planetary gear mechanism PGS4 is connected to the output member 3 including the output gear.

The carrier Ca (second element) of the first planetary gear mechanism PGS1 is connected to the carrier Cb (fifth element) of the second planetary gear mechanism PGS2 and the ring gear Rc (ninth element) of the third planetary gear mechanism PGS3, so that a first connected member Ca-Cb-Rc is formed. The ring gear Ra (third element) of the first planetary gear mechanism PGS1 and the sun gear Sd (twelfth element) of the fourth planetary gear mechanism PGS4 are connected to each other, so that a second connected member Ra-Sd is formed. The carrier Cc (eighth element) of the third planetary gear mechanism PGS3 and the carrier Cd (eleventh element) of the fourth planetary gear mechanism PGS4 are connected to each other, so that a third connected member Cc-Cd is formed.

The automatic transmission TM according to the embodiment includes one switching mechanism and six engagement mechanisms. The switching mechanism includes a first brake B1. The six engagement mechanisms include three clutches, that is, a first clutch C1 to a third clutch C3, and three brakes, that is, a second brake B2 to a fourth brake B4. The first clutch C1 is a wet multi-plate clutch of a hydraulic actuation type. The first clutch C1 is switchable between a connection state in which the sun gear Sa (first element) of the first planetary gear mechanism PGS1 and the third connected member Cc-Cd are connected to each other and a release state in which the sun gear Sa and the third connected member Cc-Cd are disconnected from each other.

The second clutch C2 is a wet multi-plate clutch of a hydraulic actuation type. The second clutch C2 is switchable between a connection state in which the sun gear Sa (first element) of the first planetary gear mechanism PGS1 and the ring gear Rb (fourth element) of the second planetary gear mechanism PGS2 are connected to each other and a release state in which the sun gear Sa and the ring gear Rb are disconnected from each other. The third clutch C3 is a wet multi-plate clutch of a hydraulic actuation type. The third clutch C3 is switchable between a connection state in which the sun gear Sb (sixth element) of the second planetary gear mechanism PGS2 and the second connected member Ra-Sd are connected to each other and a release state in which the sun gear Sb and the second connected member Ra-Sd are disconnected from each other.

The first brake B1 is a two-way clutch and is switchable between a reverse-rotation prevention state in which forward rotation (that is, rotation in the same direction as the direction of rotation of the input shaft 2) of the third connected member Cc-Cd is allowed and reverse rotation thereof is prevented and a fixed state in which the third connected member Cc-Cd is fixed to the housing 1 and is prevented from rotating. The second brake B2 is a wet multi-plate brake of a hydraulic actuation type and is switchable between a fixed state in which the sun gear Sc (seventh element) of the third planetary gear mechanism PGS3 is fixed to the housing 1 and a release state in which the sun gear Sc is unfixed from the housing 1.

The third brake B3 is a wet multi-plate brake of a hydraulic actuation type and is switchable between a fixed state in which the sun gear Sb (sixth element) of the second planetary gear mechanism PGS2 is fixed to the housing 1 and a release state in which the sun gear Sb is unfixed from the housing 1. The fourth brake B4 is a wet multi-plate brake of a hydraulic actuation type and is switchable between a fixed state in which the ring gear Rb (fourth element) of the second planetary gear mechanism PGS2 is fixed to the housing 1 and a release state in which the ring gear Rb is unfixed from the housing 1.

The state of each of the clutches C1 to C3 and the state of each of the brakes B1 to B4 are switchable by a controller EPU (see FIG. 1) including a transmission control unit on the basis of vehicle information such as vehicle travel speed.

From the side of the driving source ENG and the torque converter TC, the first clutch C1, the third planetary gear mechanism PGS3, the fourth planetary gear mechanism PGS4, the first planetary gear mechanism PGS1, the third clutch C3, the second planetary gear mechanism PGS2, and the first clutch C1 are disposed in that order on an axis of the input shaft 2.

The fourth brake B4 is disposed outside of the second planetary gear mechanism PGS2 in a radial direction. The third brake B3 is disposed outside of the third clutch C3 in the radial direction. The first brake B1 is disposed outside of the third planetary gear mechanism PGS3 in the radial direction. The second brake B2 is disposed outside of the first clutch C1 in the radial direction. In this way, when the four brakes B1 to B4 are disposed outside of the planetary gear mechanisms or the clutches in the radial direction, the axial length of the automatic transmission TM can be shortened than when the brakes B1 to B4 are, along with the planetary gear mechanisms and the clutches, disposed side by side on the axis of the input shaft 2. The fourth brake B4 may be disposed outside of the second clutch C2 in the radial direction, and the third brake B3 may be disposed outside of the second planetary gear mechanism PGS2 in the radial direction.

Next, with reference to FIGS. 3 and 4, a case in which each gear of the automatic transmission TM according to the embodiment is established is described.

To establish a first gear, the first brake B1, formed from a two-way clutch, is set in the reverse-rotation prevention state ("R" in FIG. 4), and the second brake B2 and the third brake B3 are set in the fixed state. By setting the first brake B1 in the reverse-rotation prevention state, the reverse rotation of the third connected member Cc-Cd is prevented. By setting the second brake B2 in the fixed state, the rotational speed of the sun gear Sc (seventh element) of the third planetary gear mechanism PGS3 becomes "0". The rotational speed of the third connected member Cc-Cd also becomes "0".

This causes the three elements, that is, the seventh element Sc, the eighth element Cc, and the ninth element Rc, of the third planetary gear mechanism PGS3 to be locked so that they are incapable of rotating relative to each other. Accordingly, the rotational speed of the first connected member Ca-Cb-Rc including the ring gear Rc (ninth element) of the third planetary gear mechanism PGS3 also becomes "0". In addition, the rotational speed of the ring gear Rd (tenth element) of the fourth planetary gear mechanism PGS4 to which the output member 3 is connected becomes "1st" shown in FIG. 4. In this way, the first gear is established.

In order to establish the first gear, it is not necessary to set the third brake B3 in the fixed state. However, in order to smoothly shift from the first gear to a second gear (described below), the third brake B3 is set in the fixed state in first gear. In order to activate an engine brake in first gear, the first brake B1, formed from a two-way clutch, is switched to the fixed state ("L" in FIG. 4).

In order to establish a second gear, the first brake B1, formed from a two-way clutch, is set in the reverse-rotation prevention state ("R" in FIG. 4), the second brake B2 and the third brake B3 are set in the fixed state, and the third clutch C3 is set in the connection state. By setting the first brake B1 in the reverse-rotation prevention state, forward rotation of the third connected member Cc-Cd is allowed. By setting the second brake B2 in the fixed state, the rotational speed of the sun gear Sc (seventh element) of the third planetary gear mechanism PGS3 becomes "0". By setting the third brake B3 in the fixed state, the rotational speed of the sun gear Sb (sixth element) of the second planetary gear mechanism PGS2 becomes "0".

By setting the third clutch C3 in the connection state, the rotational speed of the second connected member Ra-Sd becomes "0", which is the same as the rotational speed of the sun gear Sb (sixth element) of the second planetary gear mechanism PGS2. The rotational speed of the ring gear Rd (tenth element) of the fourth planetary gear mechanism PGS4 to which the output member 3 is connected becomes "2nd" shown in FIG. 3. In this way, the second gear is established.

In order to establish a third gear, the first brake B1, formed from a two-way clutch, is set in the reverse-rotation prevention state, the second brake B2 and the third brake B3 are set in the fixed state, and the second clutch C2 is set in the connection state. By setting the first brake B1 in the reverse-rotation prevention state, forward rotation of the third connected member Cc-Cd is allowed. By setting the second brake B2 in the fixed state, the rotational speed of the sun gear Sc (seventh element) of the third planetary gear mechanism PGS3 becomes "0". By setting the third brake B3 in the fixed state, the rotational speed of the sun gear Sb (sixth element) of the second planetary gear mechanism PGS2 becomes "0".

By setting the second clutch C2 in the connection state, the rotational speed of the ring gear Rb (fourth element) of the second planetary gear mechanism PGS2 becomes "1", which is the same as the rotational speed of the sun gear Sa (first element) of the first planetary gear mechanism PGS1 connected to the input shaft 2. Since the rotational speed of the sun gear Sb (sixth element) of the second planetary gear mechanism PGS2 becomes "0", and the rotational speed of the ring gear Rb (fourth element) becomes "1", the rotation speed of the carrier Cb (fifth element), that is, the rotational speed of the first connected member Ca-Cb-Rc becomes $i/(i+1)$. In addition, the rotational speed of the ring gear Rd (tenth element) of the fourth planetary gear mechanism PGS4 to which the output member 3 is connected becomes "3rd" shown in FIG. 3. In this way, the third gear is established.

In order to establish a fourth gear, the first brake B1, formed from a two-way clutch, is set in the reverse-rotation prevention state, the second brake B2 is set in the fixed state, and the second clutch C2 and the third clutch C3 are set in the connection state. By setting the first brake B1 in the reverse-rotation prevention state, forward rotation of the third connected member Cc-Cd is allowed. By setting the second brake B2 in the fixed state, the rotational speed of the sun gear Sc (seventh element) of the third planetary gear mechanism PGS3 becomes "0".

By setting the third clutch C3 in the connection state, the sun gear Sb (sixth element) of the second planetary gear mechanism PGS2 and the second connected member Ra-Sd rotate at the same speed. Therefore, the carrier Ca (second element) of the first planetary gear mechanism PGS1 and the carrier Cb (fifth element) of the second planetary gear mechanism PGS2 are connected to each other, and the ring gear Ra (third element) of the first planetary gear mechanism PGS1 and the sun gear Sb (sixth element) of the second planetary gear mechanism PGS2 are connected to each other. In the fourth gear in which the third clutch C3 is set in the connection state, a collinear diagram including four rotary elements formed by the first planetary gear mechanism PGS1 and the second planetary gear mechanism PGS2 can be drawn.

By setting the second clutch C2 in the connection state, the rotational speed of the ring gear Rb (fourth element) of the second planetary gear mechanism PGS2 becomes "1", which is the same as the rotational speed of the sun gear Sa (first element) of the first planetary gear mechanism PGS1. Accordingly, two of the fourth rotary elements formed by the first planetary gear mechanism PGS1 and the second planetary gear mechanism PGS2 have the same rotational speed "1".

Accordingly, all of the elements of the first planetary gear mechanism PGS1 and the second planetary gear mechanism PGS2 are set in a locked state so that they are incapable of rotating relative to each other. Therefore, the rotational speeds of all of the elements of the first planetary gear mechanism PGS1 and the second planetary gear mechanism PGS2 become "1". The rotational speed of the third connected member Cc-Cd becomes $j/(j+1)$, and the rotational speed of the ring gear Rd (tenth element) of the fourth planetary gear mechanism PGS4 to which the output member 3 is connected becomes "4th" shown in FIG. 3. In this way, the fourth gear is established.

In order to establish a fifth gear, the first brake B1, formed from a two-way clutch, is set in the reverse-rotation prevention state, the second brake B2 is set in the fixed state, and the first clutch C1 and the second clutch C2 are set in the connection state. By setting the first brake B1 in the reverse-rotation prevention state, forward rotation of the third connected member Cc-Cd is allowed. By setting the second brake B2 in the fixed state, the rotational speed of the sun gear Sc (seventh element) of the third planetary gear mechanism PGS3 becomes "0".

By setting the first clutch C1 in the connection state, the rotational speed of the third connected member Cc-Cd becomes "1", which is the same as the rotational speed of the sun gear Sa (first element) of the first planetary gear mechanism PGS1. The rotational speed of the ring gear Rd (tenth element) of the fourth planetary gear mechanism PGS4 to which the output member 3 is connected becomes "5th" shown in FIG. 3. In this way, the fifth gear is established.

In order to establish the fifth gear, it is not necessary to set the second clutch C2 in the connection state. However, it is necessary to set the second clutch C2 in the connection state in fourth gear and sixth gear. Therefore, in order to smoothly downshift from the fifth gear to the fourth gear and upshift from the fifth gear to the sixth gear (described below), the second clutch C2 is set in the connection state even in fifth gear.

In order to establish the sixth gear, the first brake B1, formed from a two-way clutch, is set in the reverse-rotation prevention state, and the first clutch C1 to the third clutch C3 are set in the connection state. By setting the first brake B1 in the reverse-rotation prevention state, forward rotation of the third connected member Cc-Cd is allowed.

By setting the second clutch C2 and the third clutch C3 in the connection mode, each of the elements of the first planetary gear mechanism PGS1 and the second planetary gear mechanism PGS2 are set in a state in which the elements are incapable of rotating relative to each other, as described in the section of the fourth gear. Therefore, the rotational speed of the second connected member Ra-Sd becomes "1". By setting the first clutch C1 in the connection state, the rotational speed of the third connected member Cc-Cd becomes "1".

Therefore, the carrier Cd (eleventh element) and the sun gear Sd (twelfth element) of the fourth planetary gear mechanism PGS4 become the same speed "1". Consequently, each element is set in the locked state so that the elements are incapable of rotating relative to each other. The rotational speed of the ring gear Rd (tenth element) of the fourth planetary gear mechanism PGS4 to which the output member 3 is connected becomes "1" indicated by "6th" shown in FIG. 3. In this way, the sixth gear is established.

In order to establish a seventh gear, the first brake B1, formed from a two-way clutch, is set in the reverse-rotation prevention state, the third brake B3 is set in the fixed state, and the first clutch C1 and the second clutch C2 are set in the connection state. By setting the first brake B1 in the reverse-rotation prevention state, forward rotation of the third connected member Cc-Cd is allowed.

By setting the third brake B3 in the fixed state, the rotational speed of the sun gear Sb (sixth element) of the second planetary gear mechanism PGS2 becomes "0". By setting the second clutch C2 in the connection state, the rotational speed of the ring gear Rb (fourth element) of the second planetary gear mechanism PGS2 becomes "1", which is the same as the rotational speed of the sun gear Sa (first element) of the first planetary gear mechanism PGS1. Therefore, the rotational speed of the first connected member Ca-Cb-Rc including the carrier Cb (fifth element) of the second planetary gear mechanism PGS2 becomes i/(i+1).

By setting the first clutch C1 in the connection state, the rotational speed of the third connected member Cc-Cd becomes "1", which is the same as the rotational speed of the sun gear Sa (first element) of the first planetary gear mechanism PGS1 connected to the input shaft 2. Thus, the rotational speed of the ring gear Rd (tenth element) of the fourth planetary gear mechanism PGS4 to which the output member 3 is connected becomes "7th" shown in FIG. 3. In this way, the seventh gear is established.

In order to establish an eighth gear, the first brake B1, formed from a two-way clutch, is set in the reverse-rotation prevention state, the third brake B3 is set in the fixed state, and the first clutch C1 and the third clutch C3 are set in the connection state. By setting the first brake B1 in the reverse-rotation prevention state, forward rotation of the third connected member Cc-Cd is allowed.

By setting the third brake B3 in the fixed state, the rotational speed of the sun gear Sb (sixth element) of the second planetary gear mechanism PGS2 becomes "0". By setting the third clutch C3 in the connection state, the rotational speed of the second connected member Ra-Sd becomes "0", which is the same as the rotational speed of the sun gear Sb (sixth element) of the second planetary gear mechanism PGS2. By setting the first clutch C1 in the connection state, the rotational speed of the third connected member Cc-Cd becomes "1", which is the same as the rotational speed of the sun gear Sa (first element) of the first planetary gear mechanism PGS1. Thus, the rotational speed of the ring gear Rd (tenth element) of the fourth planetary gear mechanism PGS4 to which the output member 3 is connected becomes "8th" shown in FIG. 3. In this way, the eighth gear is established.

In order to establish a ninth gear, the first brake B1, formed from a two-way clutch, is set in the reverse-rotation prevention state, the third brake B3 and the fourth brake B4 are set in the fixed state, and the first clutch C1 is set in the connection state. By setting the first brake B1 in the reverse-rotation prevention state, forward rotation of the third connected member Cc-Cd is allowed.

By setting the third brake B3 in the fixed state, the rotational speed of the sun gear Sb (sixth element) of the second planetary gear mechanism PGS2 becomes "0". By setting the fourth brake B4 in the fixed state, the rotational speed of the ring gear Rb (fourth element) of the second planetary gear mechanism PGS2 also becomes "0". Therefore, the elements Sb, Cb, and Rb of the second planetary gear mechanism PGS2 are in a locked state in which they are incapable of rotating relative to each other. Thus, the rotational speed of the first connected member Ca-Cb-Rc including the carrier Cb (fifth element) of the second planetary gear mechanism PGS2 also becomes "0".

By setting the first clutch C1 in the connection state, the rotational speed of the third connected member Cc-Cd becomes "1", which is the same as the rotational speed of the sun gear Sa (first element) of the first planetary gear mechanism PGS1. Thus, the rotational speed of the ring gear Rd (tenth element) of the fourth planetary gear mechanism PGS4 to which the output member 3 is connected becomes "9th" shown in FIG. 3. In this way, the ninth gear is established.

In order to establish a tenth gear, the first brake B1, formed from a two-way clutch, is set in the reverse-rotation prevention state, the fourth brake B4 is set in the fixed state, and the first clutch C1 and the third clutch C3 are set in the connection state. By setting the first brake B1 in the reverse-rotation prevention state, forward rotation of the third connected member Cc-Cd is allowed.

By setting the third clutch C3 in the connection state, the second connected member Ra-Sd and the sun gear Sb (sixth element) of the second planetary gear mechanism PGS2 rotate at the same speed. By setting the fourth brake B4 in the fixed state, the rotational speed of the ring gear Rb (fourth element) of the second planetary gear mechanism PGS2 becomes "0". By setting the first clutch C1 in the connection state, the rotational speed of the third connected member Cc-Cd becomes "1", which is the same as the rotational speed of the sun gear Sa (first element) of the first planetary gear mechanism PGS1. Thus, the rotational speed of the ring gear Rd (tenth element) of the fourth planetary gear mechanism PGS4 to which the output member 3 is connected becomes "10th" shown in FIG. 3. In this way, the tenth gear is established.

In order to establish a reverse gear, the first brake B1, formed from a two-way clutch, is set in the fixed state, the third brake B3 is set in the fixed state, and the second clutch C2 is set in the connection state. By setting the third brake B3 in the fixed state and the second clutch C2 in the connection state, the rotational speed of the first connected member Ca-Cb-Rc becomes i/(i+1). By setting the first brake B1 in the fixed state, rotation of the third connected member Cc-Cd is prevented, so that the rotational speed of the third connected member Cc-Cd becomes "0". Accordingly, the ring gear Rd (tenth element) of the fourth planetary gear mechanism PGS4 to which the output member 3 is connected becomes "Rvs" indicating reverse rotation shown in FIG. 3. In this way, the reverse gear is established.

The speed lines indicated by broken lines in FIG. 3 indicate that, among the four planetary gear mechanisms PGS1 to PGS4, each element of the planetary gear mechanisms other than the planetary gear mechanism that transmits drive power rotates (idly rotates) while following the planetary gear mechanism that transmits the drive power.

FIG. 4 shows all the states of the clutches C1 to C3 and the brakes B1 to B4 in the above-described gears. A circle in the columns of the first to third clutches C1 to C3 and the columns of the second brake B2 to the fourth brake B4 indicates the connection state or the fixed state, and an empty cell indicates the release state. In the column of the first brake B1, "R" indicates the reverse-rotation prevention state, and "L" indicates the fixed state.

"R" and "L" that are underlined indicate that the rotational speed of the third connected member Cc-Cd becomes "0" due to the function of the first brake B1. "R/L" indicates that the state is the reverse-rotation prevention state "R" at normal times, but that the state is switched to the fixed state "L" when an engine brake is activated.

FIG. 4 shows transmission gear ratio in each of the gears (the rotational speed of the input shaft 2/the rotational speed of the output member 3) when a gear ratio h of the first planetary gear mechanism PGS1 is 2.734, a gear ratio i of the second planetary gear mechanism PGS2 is 1.614, a gear ratio j of the third planetary gear mechanism PGS3 is 2.681, and a gear ratio k of the fourth planetary gear mechanism PGS4 is 1.914. FIG. 4 also shows common ratios (ratio between a transmission gear ratio and a next transmission gear ratio, that is, a value obtained by dividing a transmission gear ratio in a predetermined gear by the transmission gear ratio in the gear that is one step higher than the predetermined gear). According to FIG. 4, the common ratios can be set to appropriate values.

Next, the two-way clutch is described in detail with reference to FIGS. 5A to 5C. The first brake B1 is formed from the two-way clutch that is switchable between the connection state in which third connected member Cc-Cd is fixed to the housing 1 and the reverse-rotation prevention state in which forward rotation of the third connected member Cc-Cd is allowed and reverse rotation of the third connected member Cc-Cd is prevented. An example of the two-way clutch is shown in FIGS. 5A to 5C and is described in detail.

Figure 5A:
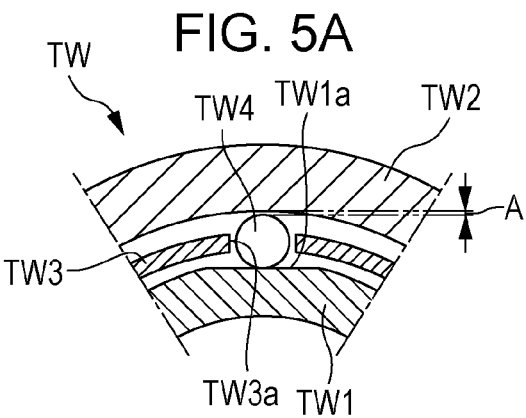
FIGS. 5A to 5C are explanatory views of a two-way clutch according to the embodiment.
Figure 5B:
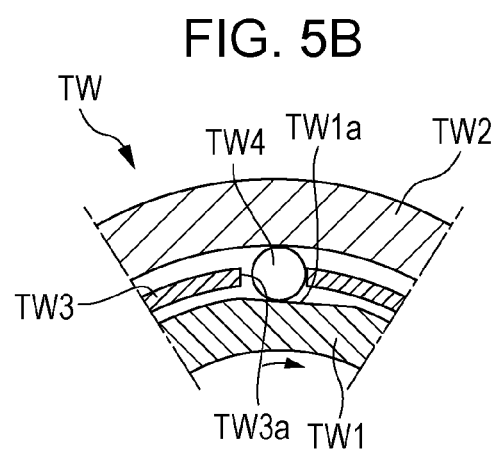
Figure 5C:
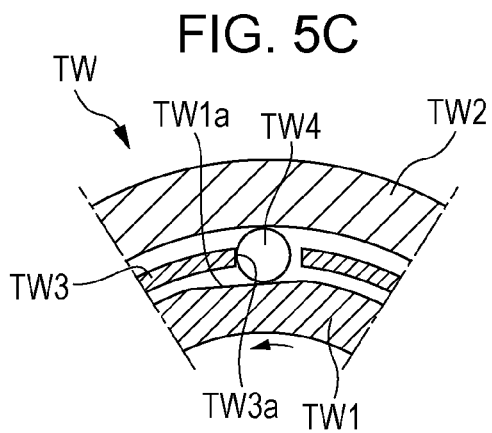

A two-way clutch TW, which forms the first brake B1, shown in FIGS. 5A to 5C includes an inner ring TW1 that is connected to the third connected member Cc-Cd, an outer ring TW2 that is disposed apart from and outwardly of the inner ring TW1 in a radial direction and that is connected to the housing 1, and a retaining ring TW3 that is disposed between the inner ring TW1 and the outer ring TW2.

A plurality of cam surfaces TW1a are formed at an outer peripheral surface of the inner ring TW1. A plurality of cutout holes TW3a are formed in the retaining ring TW3 in correspondence with the cam surfaces TW1a. Each cutout hole TW3a contains a roller TW4. The two-way clutch TW includes a meshing mechanism (not shown).

The meshing mechanism is configured so as to be switchable between an outer connection state in which the outer ring TW2 and the retaining ring TW3 are connected to each other and an inner connection state in which the inner ring TW1 and the retaining ring TW3 are connected to each other.

The diameter of the roller TW4 is set so that when, as shown in FIG. 5A, the roller TW4 exists in a central portion of the cam surface TW1a, a gap A is provided, and so that, when as shown in FIGS. 5B and 5C, the roller TW4 exists at an end portion of the cam surface TW1a, the roller TW4 contacts the inner ring TW1 and the outer ring TW2.

When the meshing mechanism is in the outer connection state in which the outer ring TW2 and the retaining ring TW3 are connected to each other, even if the inner ring TW1 tries to rotate in the forward direction or the backward direction, the roller TW4 is positioned at an end portion of the cam surface TW1a because the retaining ring TW3 is also fixed to the housing 1.

At this time, the roller TW4 is sandwiched by an inner peripheral surface of the outer ring TW2 and the cam surface TW1a, so that rotation of the inner ring TW1 is prevented. That is, the two-way clutch TW is set in the fixed state.

The meshing mechanism (not shown) is configured so that, in the inner connection state in which the inner ring TW1 and the retaining ring TW3 are connected to each other, as shown in FIG. 5B, the cutout hole TW3a is positioned at one of the end portions of the cam surface TW1a.

If the clockwise direction in FIGS. 5A to 5C is defined as the reverse rotation direction, the two-way clutch TW is set in the reverse-rotation prevention state by setting the two-way clutch TW in the inner connection state in which the inner ring TW1 and the retaining ring TW3 are connected to each other.

A vehicle on which the automatic transmission TM according to the embodiment is mounted includes a shift-by-wire shift lever 42 (a shift position detecting unit), an oil temperature detecting unit 43a, a vehicle speed detecting unit 44, an engine brake determining unit 46, a driving source rotational speed detecting unit 48, an input rotational speed detecting unit 50, a brake pedal detecting unit 54, and an accelerator pedal opening detecting unit 56. The shift-by-wire shift lever 42 can selectably switch the shift position to any one of a forward movement range, a neutral movement range, and a backward movement range. The oil temperature detecting unit 43a detects the temperature of oil (the oil temperature) in an oil pressure control circuit 43. The vehicle speed detecting unit 44 detects the travel speed of the vehicle. The engine brake determining unit 46 detects whether an engine brake is on or off. The driving source rotational speed detecting unit 48 detects the rotational speed of the driving source ENG. The input rotational speed detecting unit 50 detects the rotational speed of the input shaft 2. The brake pedal detecting unit 54 detects whether a brake pedal is on or off. The accelerator pedal opening detecting unit 56 detects whether an accelerator pedal is on or off.

A controller ECU receives information regarding the shift position of the shift lever 42, information regarding the temperature of oil (oil temperature) of the oil pressure control circuit 43 output from the oil temperature detecting unit 43a, information regarding travel speed of the vehicle output from the vehicle speed detecting unit 44, information regarding on/off of an engine brake as condition of use of the engine brake output from the engine brake determining unit 46, information regarding the rotational speed of the driving source ENG output from the driving source rotational speed detecting unit 48, information regarding the rotational speed of the input shaft 2 output from the input rotational speed detecting unit 50, information regarding on/off of a brake pedal output from the brake pedal detecting unit 54, and information regarding on/off of an accelerator pedal output from the accelerator pedal opening detecting unit 56.

Figure 6:
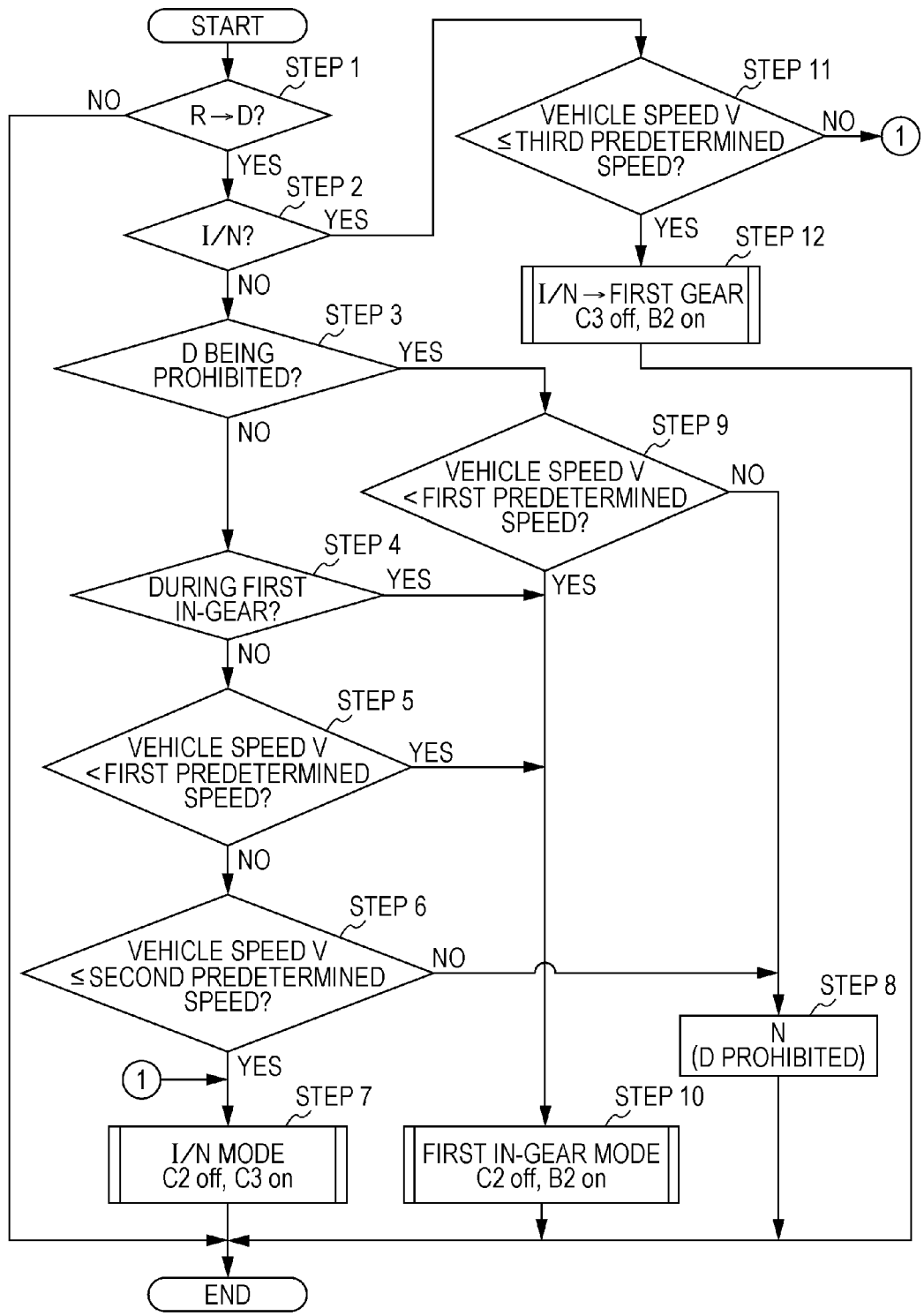
FIG. 6 is a flowchart of a process of a controller according to the embodiment.
Figure 7:
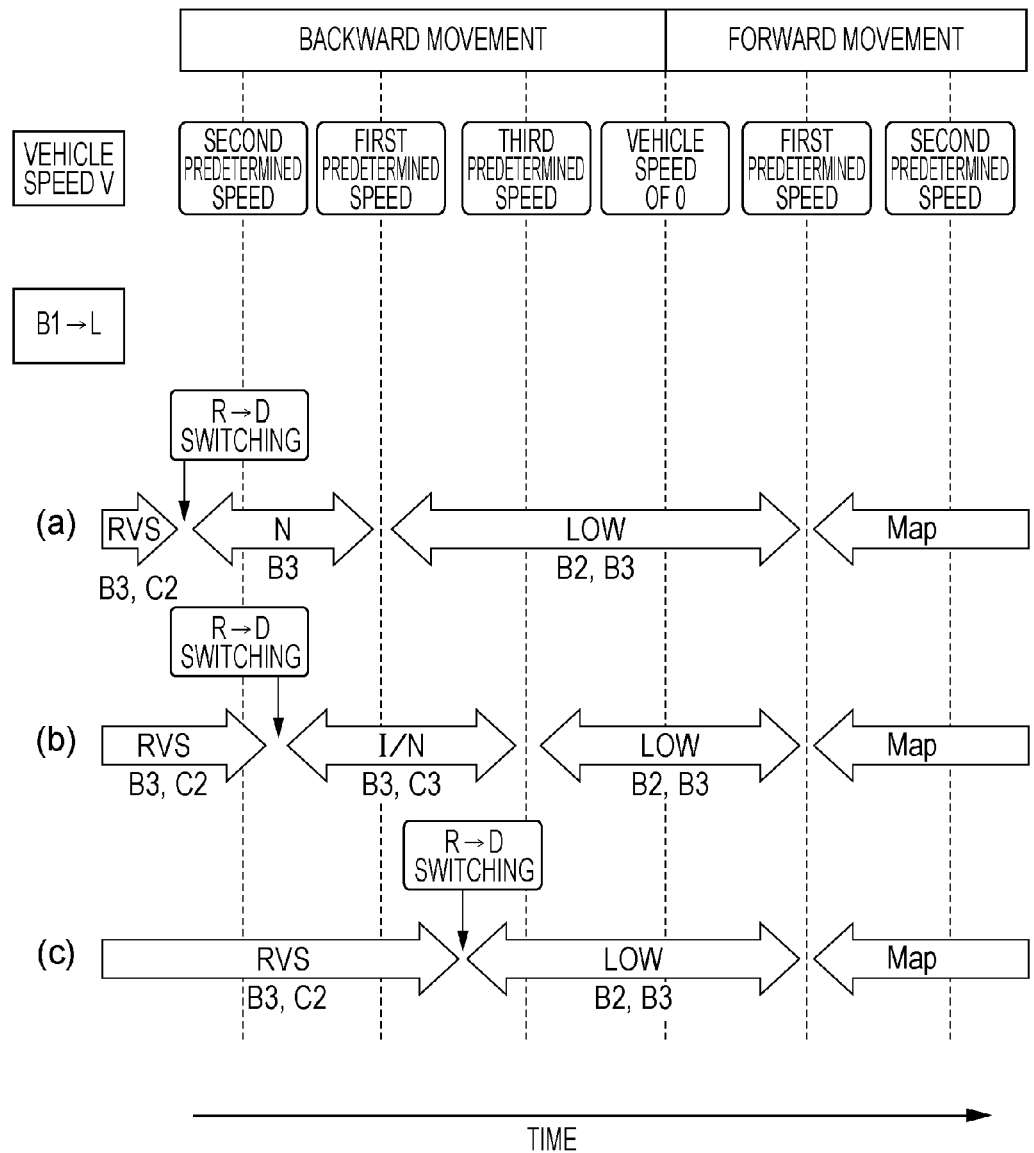
FIG. 7 is an explanatory view of transitions between states of the automatic transmission according to the embodiment when a first brake is in a fixed state.

Next, with reference to FIGS. 6 and 7, the operation of the controller ECU at the automatic transmission TM according to the embodiment is described. Here, the vehicle is moving backward and the shift position is switched from the backward movement range to the forward movement range by a shift operation of a driver. The controller ECU executes the steps in the flowchart of FIG. 6 in a predetermined cycle time.

Figure 8:
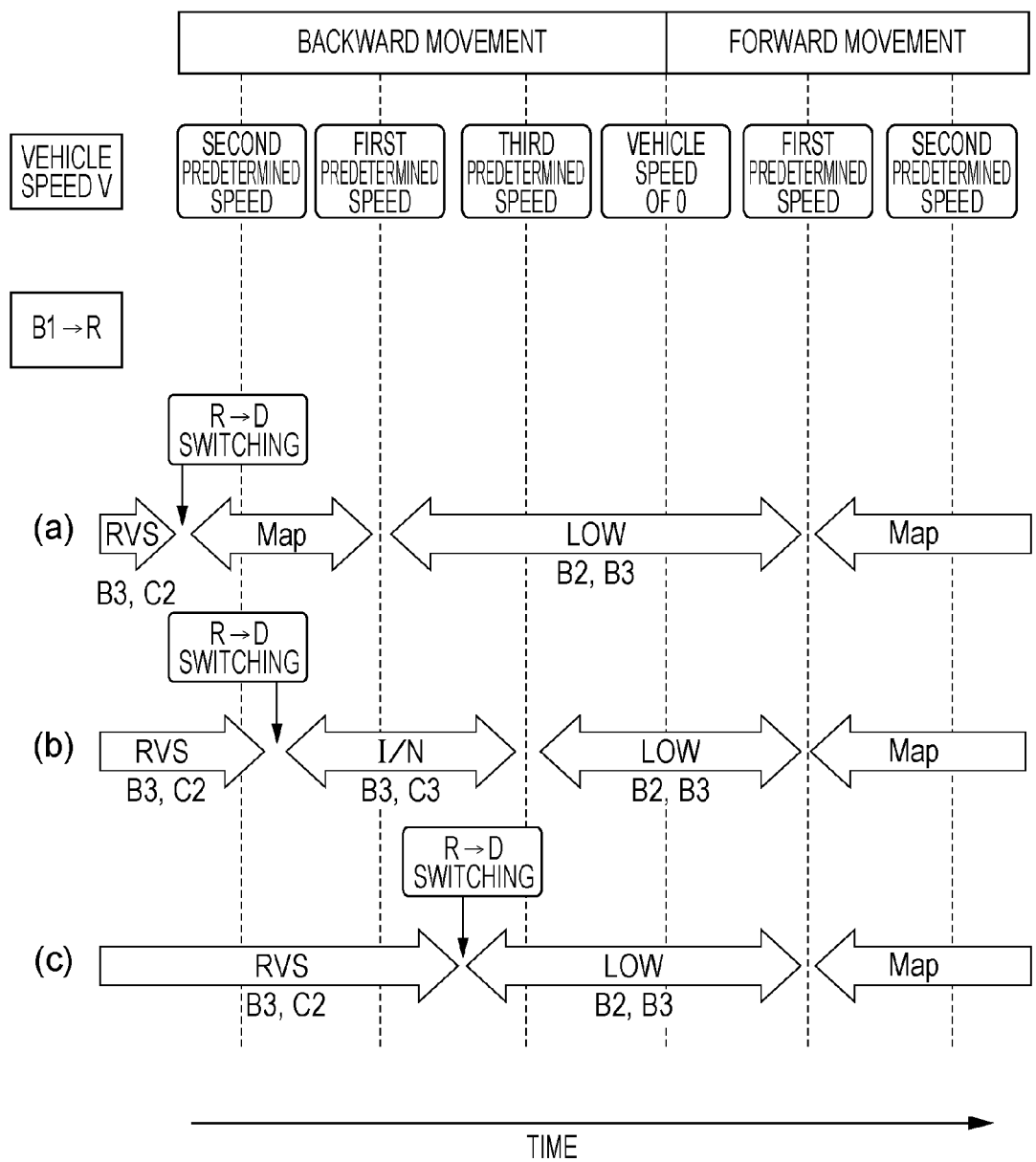
FIG. 8 is an explanatory view of transitions between states of the automatic transmission according to the embodiment when the first brake is in a reverse-rotation prevention state.

In the flowchart of FIG. 6 and FIG. 7, it is assumed that the first brake B1 is in the fixed state (B1→L). FIG. 8 shows transitions for a state (B1→R) when the first brake B1 is in the reverse-rotation prevention state (R). "Map" in FIGS. 7 and 8 indicates that ordinary control is performed on the basis of map data that is stored in the controller. The embodiment is described on the assumption that the travel speed of the vehicle can only be measured using an absolute value and that vehicle speed that is used is one in which forward movement and backward movement cannot be isolated from each other.

In the flowchart of FIG. 6, first, in Step 1, it is determined whether or not a shift position is switched from the backward movement range to the forward movement range by a shift operation of a driver when the vehicle is moving backward. If the shift position is not switched from the backward movement range to the forward movement range, this process ends.

However, if, in Step 1, the shift position is switched to the forward movement range, the process proceeds to Step 2, where it is determined whether or not an idle neutral engagement state is set.

In the embodiment, the idle neutral engagement state is defined as a state in which the controller ECU sets the third brake B3 in the fixed state and sets the third clutch C3 in the connection state so as to allow the input shaft 2 to rotate freely and to prevent the rotation of the output member 3.

If, in Step 2, the idle neutral engagement state is not set, the process proceeds to Step 3, where it is determined whether or not neutral control (N (D prohibited)) is being performed. If the neutral control (N (D prohibited)) is not being performed, the process proceeds to Step 4, where it is determined whether or not the gear is a If the gear is not the first in-gear, the process proceeds to Step 5, where it is determined whether or not a vehicle speed V (in this case, the vehicle speed in the backward direction), serving as the travel speed of the vehicle, is less than a first predetermined speed.

If, in Step 5, the vehicle speed V is not less than the first predetermined speed, that is, the vehicle speed V is greater than or equal to the first predetermined speed, the process proceeds to Step 6, where it is determined whether or not the vehicle speed V is less than or equal to a second predetermined speed, which is greater than the first predetermined speed and which is a condition for changing to the idle neutral engagement state.

If, in Step 6, the vehicle speed V is less than or equal to the second predetermined speed, the process proceeds to Step 7, where the third brake B3 is kept in the connection state (kept engaged), the second clutch C2 is set in the release state (off), and the third clutch C3 is set in the connection state (on). The state is changed to the idle neutral engagement state (I/N mode), and this process ends.

If, in Step 6, the vehicle speed V is not less than or equal to the second predetermined speed, that is, the vehicle speed exceeds the second predetermined speed, the process branches off to Step 8, where neutral control (N (D prohibited)) is performed, and this process ends. In the neutral control, the engagement mechanisms are controlled so that a neutral state is set (for example, only the third brake B3 is kept in the fixed state and the second clutch C2 is set in the release state).

If, in Step 3, the neutral control (N (D prohibited)) is being performed, the process branches off to Step 9, where it is determined whether or not the vehicle speed V is less than the first predetermined speed. If the vehicle speed V is not less than the first predetermined speed, that is, the vehicle speed V is greater than or equal to the first predetermined speed, the process branches off to Step 8, where neutral control (N (D prohibited)) is performed, and this process ends.

If, in Step 9, the vehicle speed V is less than the first predetermined speed, the process proceeds to Step 10, where a first in-gear mode is executed, and this process ends. In the first in-gear mode, the third brake B3 is kept in the fixed state, the second clutch C2 is set in the release state (off), and the second brake B2 is set in the fixed state (on).

If, in Step S4, the first in-gear mode is being executed, the process branches off to Step 10, where the first in-gear mode is executed, and this process ends. If, in Step S5, the vehicle speed V is less than the first predetermined speed, the process branches off to Step 10, where the first in-gear mode is executed, and this process ends.

If, in Step S2, the state is the idle neutral engagement state, the process branches off to Step 11, where it is determined whether or not the vehicle speed V is less than or equal to a third predetermined speed at which there is no possibility of an engine stall. Here, the third predetermined speed is set to a speed that is less than the first predetermined speed and at which there is no possibility of an engine stall because an input load to a torque converter is low.

If the vehicle speed V is not less than the third predetermined speed, that is, the vehicle speed V is greater than or equal to the third predetermined speed, the process proceeds to Step 7, where the idle neutral control is continued, and this process ends.

If, in Step 11, the vehicle speed V is less than or equal to the third predetermined speed, the process branches off to Step 12, where the third clutch C3 is set in the release state (off) and the second brake B2 is set in the fixed state (on). The idle neutral engagement state is ended, and this process ends.

If the driving wheels are locked and slide when the state is the idle neutral engagement state, the controller appropriately controls the engagement mechanisms C1 to C3 and B2 to B4 so that they can be unlocked.

In the embodiment, after shifting to the first in-gear, the first brake B1 is switched from the fixed state to the reverse-rotation prevention state. However, it is possible to, prior to shifting to the first in-gear, switch the first brake B1 from the fixed state to the reverse-rotation prevention state and set the second brake B2 in the fixed state, so that a second in-gear is set; and, then, switch the third clutch C3 to the release state, so that the first in-gear is set.

According to the automatic transmission TM of the embodiment, when, during backward movement, the vehicle speed is less than or equal to the second predetermined speed and is greater than or equal to the first predetermined speed, the engagement mechanisms are controlled so that, by setting the second clutch C2 in the release state and the third clutch C3 in the engagement state, the idle neutral engagement state is set such that the input member can freely rotate and the rotation of the output member is prevented. If the vehicle speed exceeds the second predetermined speed, when the rotation of the output member 3 is prevented, the driving wheels may become locked and slide.

Therefore, if the vehicle speed exceeds the second predetermined speed, the neutral state is set and a reduction of the vehicle speed to a speed that is less than the first predetermined speed is waited for. After the vehicle speed has been reduced to a speed that is less than the first predetermined speed, the first in-gear is set.

By this, even if the vehicle is moving in the backward direction, it is possible to prevent a turbine of a torque converter from rotating in the reverse direction. Therefore, according to the automatic transmission TM of the embodiment, it is possible to prevent input of a high load to the torque converter when the backward movement range is switched to the forward movement range, and, thus, to prevent an engine stall. When the vehicle is moving backward and the vehicle speed is less than the first predetermined speed, there is no possibility of a high load being input to the torque converter. Therefore, it is possible to immediately shift to the first in-gear.

In the automatic transmission TM according to the embodiment, any one of the gears (such as the tenth gear) may be removed to provide a 9-forward-speed transmission.

In the embodiment, the shift position is switched by operating the shift-by-wire shift lever. However, the method for switching the shift position is not limited thereto. For example, the automatic transmission TM may be configured so that the shift position is shifted by pressing a button. In this case, the automatic transmission TM may be configured so that, for example, the shift position that has been selected on the basis of a button press signal is determined.

According to the embodiment of the present disclosure, there is provided an automatic transmission including an input member that is disposed in a housing and that receives power of a driving source via a torque converter; a planetary gear mechanism including a plurality of elements that are rotatable in the housing; a plurality of engagement mechanisms that are switchable to a connection state in which the elements are connected to each other or to a fixed state in which the elements are fixed to the housing; an output member; a shift position detecting unit that detects a shift position; an input rotational speed detecting unit that detects a rotational speed of the input member; and a controller that receives information regarding the detected rotational speed from the input rotational speed detecting unit and information regarding the shift position from the shift position detecting unit, and that controls the engagement mechanisms, wherein the rotational speed of the input member is changed into a plurality of gear speeds and rotation of the input member being freely output from the output member. The automatic transmission further includes a switching mechanism that is switchable between a reverse-rotation prevention state and a fixed state, the reverse-rotation prevention state being a state in which forward rotation of one of the plurality of elements is allowed and reverse rotation of the one of the plurality of elements is prevented, the forward rotation being in a rotation direction when a vehicle moves forward, the reverse rotation being in a rotation direction when the vehicle moves backward, the fixed state being a state in which the one of the plurality of elements is fixed to the housing. The controller sets the switching mechanism in the reverse-rotation prevention state when the shift position is set in a forward movement range and sets the switching mechanism in the fixed state when the shift position is set in a backward movement range. When the vehicle is moving backward and the shift position is switched from the backward movement range to the forward movement range, if a vehicle speed is greater than or equal to a first predetermined speed, the controller controls the engagement mechanisms so that the input member is capable of rotating freely and rotation of the output member is prevented.

According to the automatic transmission of the embodiment of the present disclosure, if, during backward movement, the shift position is switched from the backward movement range to the forward movement range, and the vehicle speed is greater than or equal to the first predetermined speed, the engagement mechanisms are controlled so that the input member can freely rotate and the rotation of the output member is prevented. This state is defined as an idle neutral engagement state. By this, even if the vehicle is moving backward, it is possible to prevent reverse rotation of the turbine of the torque converter.

Therefore, according to the embodiment of the present disclosure, it is possible to prevent an engine stall by preventing input of a high load to the torque converter when the shift position is switched from the backward movement range to the forward movement range.

In the embodiment of the present disclosure, one engagement mechanism that is engaged in an engagement combination when the automatic transmission establishes a forward lowest gear may be swapped for a combination of the engagement mechanisms, and one engagement mechanism that is engaged in an engagement combination when the automatic transmission establishes a reverse gear may be swapped for the combination of the engagement mechanisms.

According to such a structure, it is possible to easily shift from a reverse gear to the idle neutral engagement state.

In the embodiment of the present disclosure, when it is detected by the shift position detecting unit that the reverse gear is selected, if the vehicle speed is less than or equal to the second predetermined speed that is set greater than the first predetermined speed, the controller may control the engagement mechanisms so that the input member can rotate freely and the rotation of the output member is prevented, whereas, if the vehicle speed exceeds the second predetermined speed, the controller may control the engagement mechanism, so that a neutral state is set.

When an attempt is made to prevent the rotation of the output member while the vehicle speed is too high, excessive friction heat may be generated at the engagement mechanisms, and, for example, a driver may have a feeling of strangeness due to a sudden reduction in the vehicle speed.

In this case, as mentioned above, when the vehicle speed exceeds the second predetermined speed at which excessive heat generation at the engagement mechanism and sudden reduction in vehicle speed are assumed, the controller performs control so that the neutral state is set so as to allow the output member to rotate freely. This makes it possible to suppress heat generation at the friction engagement mechanisms and to prevent a sudden reduction in the vehicle speed.

In the embodiment of the present disclosure, if the vehicle speed is less than or equal to a third predetermined speed that is less than the first predetermined speed and at which an input load to the torque converter is low, the controller may change a combination of the engagement mechanisms to a combination that establishes a forward lowest gear.

According to such a structure, since there is no input of a high load to the torque converter, it is possible to smoothly shift to a forward gear.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission comprising an input member that is disposed in a housing and that receives power of a driving source via a torque converter, a planetary gear mechanism including a plurality of elements that are rotatable in the housing, a plurality of engagement mechanisms that are each switchable to a connection state in which the plurality of engagement elements are connected to each other or to a fixed state in which the plurality of engagement elements are fixed to the housing, an output member, a shift position detecting unit that detects a shift position, an input rotational speed detecting unit that detects a rotational speed of the input member; and a controller that receives information regarding the detected rotational speed from the input rotational speed detecting unit and information regarding the shift position from the shift position detecting unit, and that controls the engagement mechanisms, wherein the rotational speed of the input member is changed into a plurality of gear speeds and rotation of the input member is freely output to the output member and the automatic transmission further comprises a switching mechanism that is switchable between a reverse-rotation prevention state and a second fixed state, the reverse-rotation prevention state being a first state in which forward rotation of one of the plurality of elements is allowed and reverse rotation of the one of the plurality of elements is prevented, the forward rotation being in a rotation direction when a vehicle moves forward, the reverse rotation being in a rotation direction when the vehicle moves backward, the second fixed state being a second state in which the one of the plurality of elements is fixed to the housing, wherein the controller sets the switching mechanism in the reverse-rotation prevention state when the shift position is set in a forward movement range and sets the switching mechanism in the second fixed state when the shift position is set in a backward movement range, and wherein, when the vehicle is moving backward and the shift position is switched from the backward movement range to the forward movement range, if a vehicle speed is greater than or equal to a first predetermined speed, the controller controls the engagement mechanisms so that the input member is capable of rotating freely and rotation of the output member is prevented.

2. The automatic transmission according to claim 1, wherein one engagement mechanism of the plurality of engagement mechanisms that is engaged in an engagement combination when the automatic transmission establishes a forward lowest gear is capable of being swapped for a combination of the engagement mechanisms, and one engagement mechanism of the plurality of engagement mechanisms that is engaged in an engagement combination when the automatic transmission establishes a reverse gear is capable of being swapped for the combination of the engagement mechanisms.

3. The automatic transmission according to claim 1, wherein, if it is detected by the shift position detecting unit that a reverse gear is selected and the vehicle speed exceeds a second predetermined speed that is greater than the first predetermined speed, the controller controls the engagement mechanisms so that a neutral state is set.

4. The automatic transmission according to claim 1,
wherein, if the vehicle speed is less than or equal to a third predetermined speed that is less than the first predetermined speed and at which an input load to the torque converter is low, the controller changes a combination of the engagement mechanisms to a combination that establishes a forward lowest gear.

5. An automatic transmission comprising an input member that is disposed in a housing and that receives power of a driving source via a torque converter, a planetary gear mechanism including a plurality of elements that are rotatable in the housing; a plurality of engagement mechanisms each switchable to a connection state in which the plurality of engagement elements are connected to each other or to a fixed state in which the plurality of engagement elements are fixed to the housing, an output member to which a rotation of the input member is transmitted to change a rotational speed of the output member, a shift position detector configured to detect a shift position, an input rotational speed detector configured to detect a rotational speed of the input member; and a controller configured to receive information regarding the detected rotational speed from the input rotational speed detector and information regarding the shift position from the shift position detector, a switching mechanism switchable between a reverse-rotation prevention state and a second fixed state, the reverse-rotation prevention state being a first state in which forward rotation of one of the plurality of elements is allowed and reverse rotation of the one of the plurality of elements is prevented, the forward rotation being in a rotation direction when a vehicle moves forward, the reverse rotation being in a rotation direction when the vehicle moves backward, the second fixed state being a second state in which the one of the plurality of elements is fixed to the housing the controller being configured to set the switching mechanism in the reverse-rotation prevention state when the shift position is set in a forward movement range and configured to set the switching mechanism in the second fixed state when the shift position is set in a backward movement range; and the controller being configured to control the plurality of engagement mechanisms so that the input member is capable of rotating and rotation of the output member is prevented in a case in which the vehicle is moving backward, the shift position is switched from the backward movement range to the forward movement range, and a vehicle speed is greater than or equal to a first predetermined speed.

6. The automatic transmission according to claim 5,
wherein one engagement mechanism among the plurality of engagement mechanisms that is engaged in an engagement combination when the automatic transmission establishes a forward lowest gear is capable of being swapped for a combination of the plurality of engagement mechanisms, and one engagement mechanism among the plurality of engagement mechanisms that is engaged in an engagement combination when the automatic transmission establishes a reverse gear is capable of being swapped for the combination of the plurality of engagement mechanisms, and
wherein in the combination of the plurality of engagement mechanisms, the input member is capable of rotating and rotation of the output member is prevented.

7. The automatic transmission according to claim 5, wherein, if it is detected by the shift position detector that a reverse gear is selected and the vehicle speed exceeds a second predetermined speed that is greater than the first predetermined speed, the controller controls the plurality of engagement mechanisms so that a neutral state is set.

8. The automatic transmission according to claim 5,
wherein, if the vehicle speed is less than or equal to a third predetermined speed that is less than the first predetermined speed and at which an input load to the torque converter is low, the controller changes a combination of the plurality of engagement mechanisms to a combination that establishes a forward lowest gear.

9. The automatic transmission according to claim 5,
wherein, if the vehicle speed is greater than a second predetermined speed that is greater than the first predetermined speed, the controller controls the plurality of engagement mechanisms so that a neutral state is set.

10. The automatic transmission according to claim 5,
wherein, if the vehicle speed is less than the first predetermined speed, the controller controls the plurality of engagement mechanisms so that a forward lowest gear is established.

* * * * *